United States Patent
Breznak

(10) Patent No.: US 8,735,782 B2
(45) Date of Patent: May 27, 2014

(54) SYSTEM FOR FORMING BRAZED JOINT BETWEEN TIE WIRE AND WORKPIECE, AND METHODS THEREFOR

(75) Inventor: Jeffrey Michael Breznak, Waterford, NY (US)

(73) Assignee: General Electric Company, Schenectady, NY (US)

( * ) Notice: Subject to any disclaimer, the term of this patent is extended or adjusted under 35 U.S.C. 154(b) by 620 days.

(21) Appl. No.: 12/765,172

(22) Filed: Apr. 22, 2010

(65) Prior Publication Data

US 2011/0259876 A1    Oct. 27, 2011

(51) Int. Cl.
 *B23K 1/002*    (2006.01)

(52) U.S. Cl.
 USPC ........... 219/615; 219/604; 219/605; 219/616; 219/617; 219/618; 219/635; 219/636

(58) Field of Classification Search
 USPC ......... 219/615, 604, 605, 616, 617, 618, 635, 219/636
 See application file for complete search history.

(56) References Cited

U.S. PATENT DOCUMENTS

| | | | |
|---|---|---|---|
| 5,222,654 A | | 6/1993 | Oki et al. |
| 5,393,200 A | | 2/1995 | Dinh et al. |
| 5,630,958 A | * | 5/1997 | Stewart et al. ................. 219/670 |
| 6,128,820 A | * | 10/2000 | Nolan et al. .................. 29/889.1 |
| 6,814,543 B2 | * | 11/2004 | Barb et al. ......................... 416/1 |
| 7,199,338 B2 | | 4/2007 | Breznak et al. |
| 7,334,316 B2 | | 2/2008 | Wang et al. |
| 7,405,379 B2 | * | 7/2008 | Breznak et al. ............... 219/615 |
| 7,474,022 B2 | | 1/2009 | Silliman et al. |
| 2005/0199615 A1 | * | 9/2005 | Barber et al. .................. 219/672 |
| 2009/0107989 A1 | * | 4/2009 | Gramoll et al. ............... 219/615 |
| 2009/0126838 A1 | * | 5/2009 | Silvia et al. .................... 148/660 |
| 2010/0247318 A1 | * | 9/2010 | Slepski et al. ............. 416/223 A |

OTHER PUBLICATIONS

Jonas, Otakar; Steam Turbine Corrosion, Materials Performance vol. 24, No. 2; Feb. 1985, pp. 9-18.*

Stainless Processing, Inc.; ferritic grades; http://web.archive.org/web/20080317213920/http://www.spiusa.com/Ref001/ferritic1.html; Avaliable Mar. 2009; p. 1.*

* cited by examiner

*Primary Examiner* — Michael Jung
*Assistant Examiner* — John P Dulka
(74) *Attorney, Agent, or Firm* — Ernst G. Cusick; Hoffman Warnick LLC

(57) ABSTRACT

A system for forming a brazed joint between a tie wire and a workpiece, and methods therefor are presented. The system includes: a braze chamber including an induction heating coil, the induction heating coil having magnetic flux concentrators thereon; and a controller receiving a temperature feedback signal from a temperature sensor on a tie wire and controlling a temperature of a section of the tie wire to be brazed by controlling an electrical current applied to the induction heating coil.

20 Claims, 4 Drawing Sheets

SYSTEM FOR FORMING BRAZED JOINT BETWEEN TIE WIRE AND WORKPIECE, AND METHODS THEREFOR

BACKGROUND OF THE INVENTION

The invention generally relates to a joint between a tie wire and a workpiece, e.g., a turbine bucket or blade. Further, the invention relates to a system for forming a brazed joint between the tie wire and the workpiece of a turbine, and methods therefor.

Typical turbine designs include a tie wire joined with a workpiece such as a bucket via, e.g., a torch braze process.

BRIEF DESCRIPTION OF THE INVENTION

A first aspect of the disclosure provides a system for forming a brazed joint, the system comprising: a braze chamber including an induction heating coil, the induction heating coil having magnetic flux concentrators thereon; and a controller receiving a temperature feedback signal from a temperature sensor on a tie wire and controlling a temperature of a section of the tie wire to be brazed by controlling an electrical current applied to the induction heating coil.

A second aspect of the disclosure provides a method of forming a brazed joint, the method comprising: placing a tie wire within an induction heating coil of a braze chamber, the induction heating coil having magnetic flux concentrators thereon; aligning a section of a workpiece for brazing with a section of the tie wire for brazing; applying a braze alloy in contact with the section of the workpiece and the section of the tie wire to be brazed; and applying an electrical current to the induction heating coil to heat the section of the tie wire therebetween to form the brazed joint.

A third aspect of the disclosure provides a method of forming a brazed joint, the method comprising: placing a tie wire within an induction heating coil of a braze chamber, the induction heating coil having magnetic flux concentrators thereon; and applying an electrical current to the induction heating coil to heat a section of the tie wire therebetween to a temperature range of approximately 705° C. to approximately 810° C. for approximately 30 sec to approximately 10 min, wherein the section of the tie wire is aligned with a section of a workpiece for brazing, and the section of the tie wire and the section of the workpiece are in contact with a braze alloy.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

DETAILED DESCRIPTION OF THE INVENTION

Typical torch brazing processes used in, e.g., steam turbines to join a tie wire with a bucket, often cause overheating of the bucket due to lack of controlled heating of the sections of the tie wire and/or the bucket to be joined. Over heating can cause hard spots to be formed during cooling of the brazed joint. Over time, the hard spots may cause stress corrosion cracking when exposed to a steam environment such as a last stage bucket in a steam turbine. To compensate for over heating, under heating may be performed which often compromises the quality, i.e., the strength of the brazed joint due to voids formed from lack of braze alloy wetting the pieces or lack of braze alloy flow.

Figure 1:
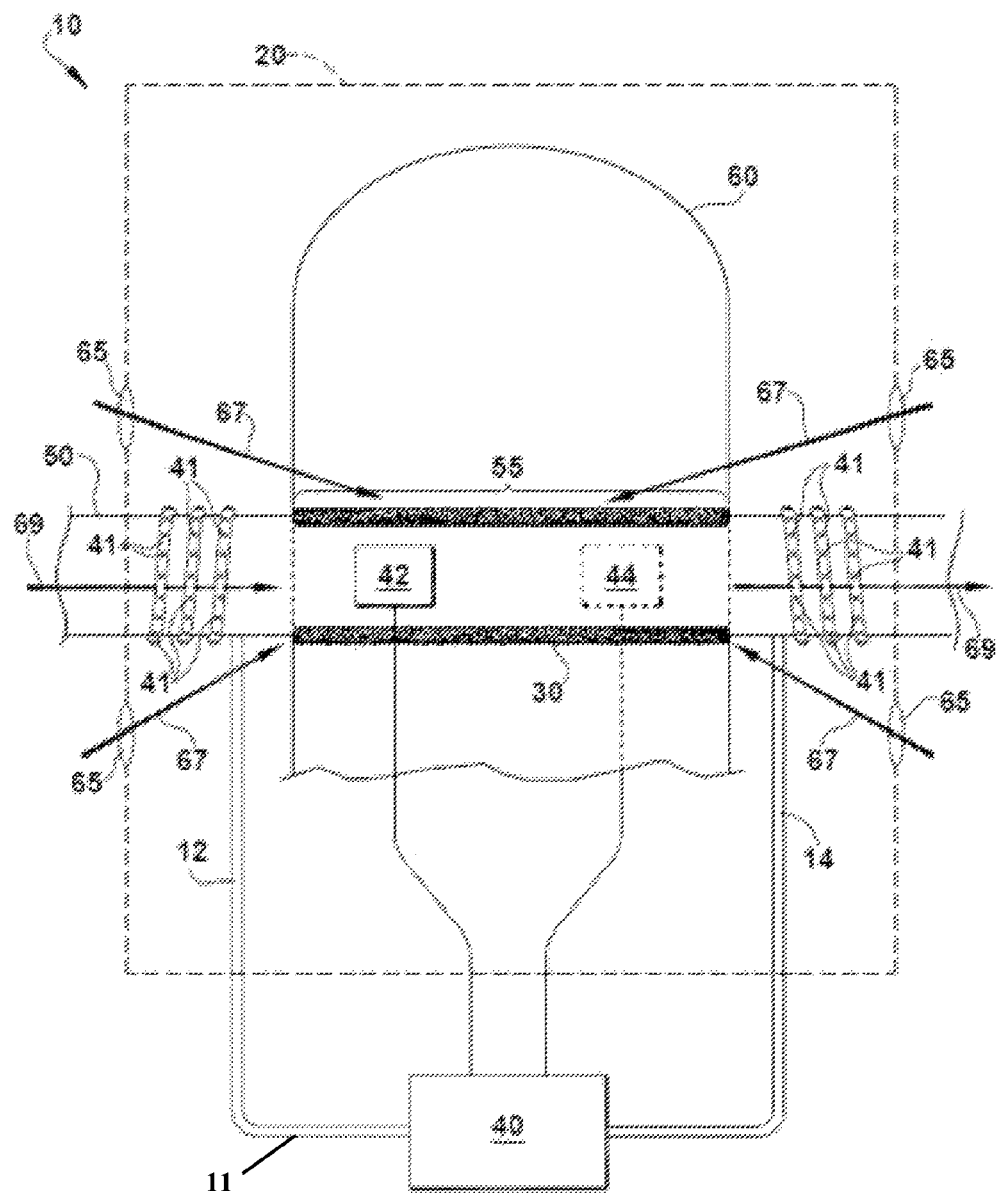
FIG. 1 shows a schematic illustration of an embodiment of a system for forming a brazed joint between a tie wire and a workpiece, in accordance with the present invention.

Referring to FIG. 1, an embodiment of a system for forming a brazed joint between a tie wire and a workpiece is shown. System 10 includes a braze chamber 20 and a controller 40. A supply of tie wire 50 and braze alloy 30 may be fed into braze chamber 20 via directional arrows 69 and 67 respectively. A workpiece 60 may also be positioned in braze chamber 20. Braze chamber 20 may comprise a split hood (not shown) that when closed and purged may provide an essentially oxygen free atmosphere. Braze chamber 20 may provide an isolated environment that may be an essentially oxygen free atmosphere and may be closed to the outside atmosphere. Alternatively, braze chamber 20 may provide an environment that may be an essentially oxygen free atmosphere via positive pressure but may still be open to the outside atmosphere. Braze chamber 20 may also include braze alloy feed holes 65 for applying a braze alloy when braze chamber 20 is closed.

In an embodiment, braze chamber 20 may provide an environment wherein the essentially oxygen free atmosphere comprises an oxygen level of approximately 400 parts per million or less. Braze chamber 20 may also provide an environment comprising a reducing or protecting atmosphere. The reducing atmosphere may include a reducing gas, such as argon plus hydrogen, and the like. The protecting atmosphere may include an inert gas such as nitrogen and the like. In another embodiment, braze chamber 20 may provide a vacuum environment such that the pressure within braze chamber 20 is $1\times10^{-6}$ atm or less.

Braze chamber 20 may comprise an induction heating coil 11 having ends 12 and 14 that may heat a workpiece therebetween such as a tie wire 50. Induction heating coil 11 may be connected to an alternate current (AC) power supply such as controller 40. Induction heating systems and the principles of induction heating are known in the art. Induction heating coil 11 may have magnetic flux concentrators 41 thereon which direct most of the magnetic flux from each induction heating coil end 12 and 14 toward the other induction heating coil end along a section of a workpiece therebetween.

Figure 2:
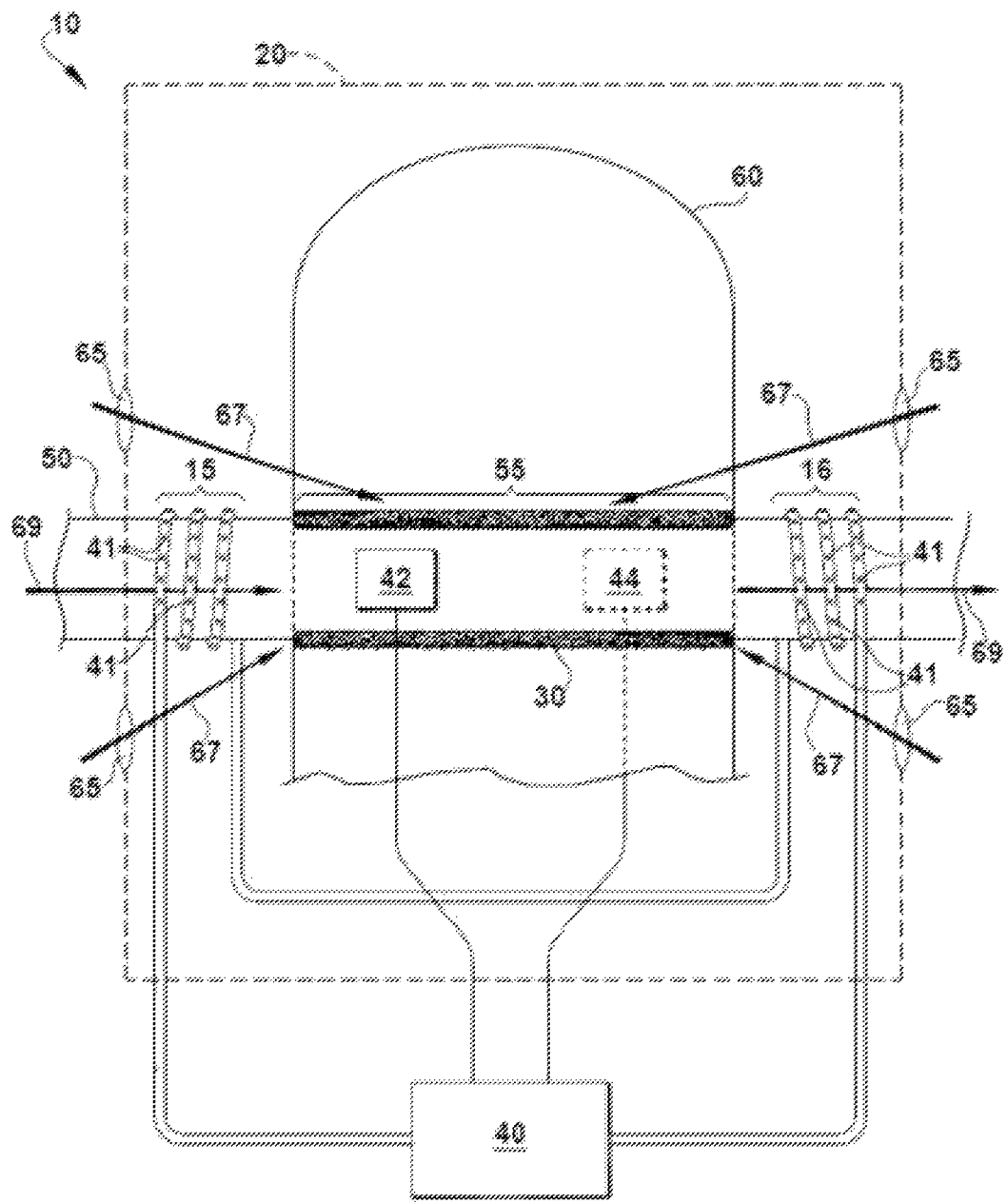
FIG. 2 shows a schematic illustration of another embodiment of a system for forming a brazed joint between a tie wire and a workpiece, in accordance with the present invention.
Figure 3:
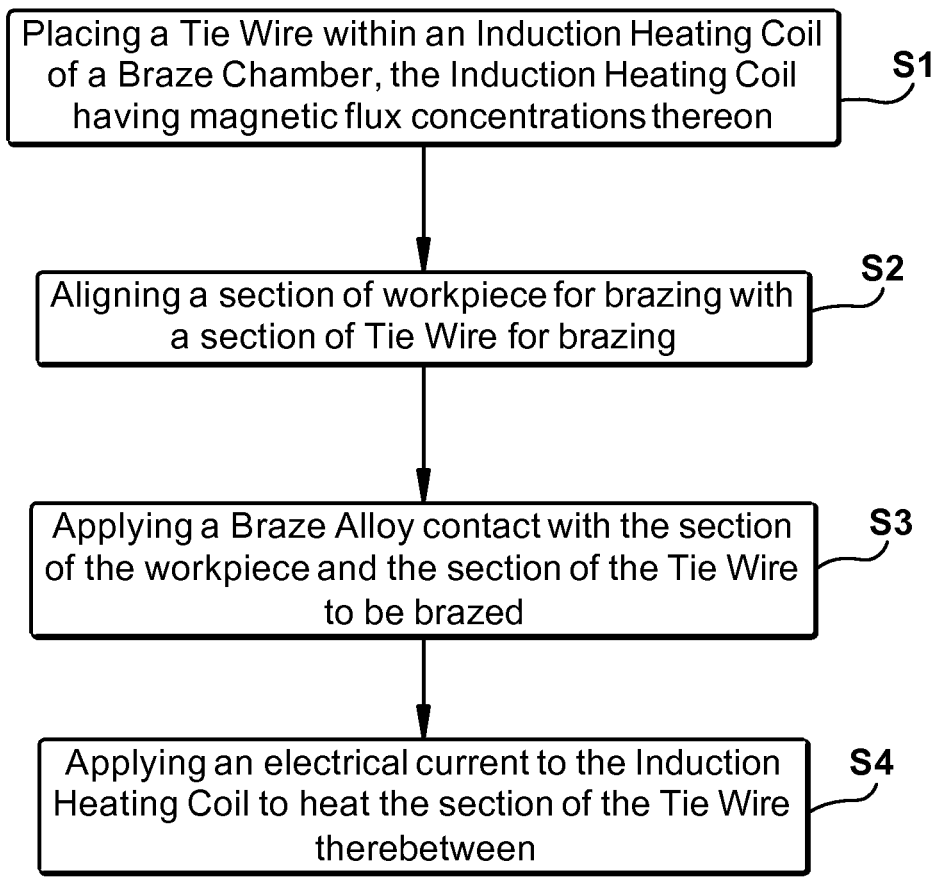
FIG. 3 shows a flow diagram of an embodiment of a method of forming a brazed joint between a tie wire and a workpiece, in accordance with the present invention.
Figure 4:
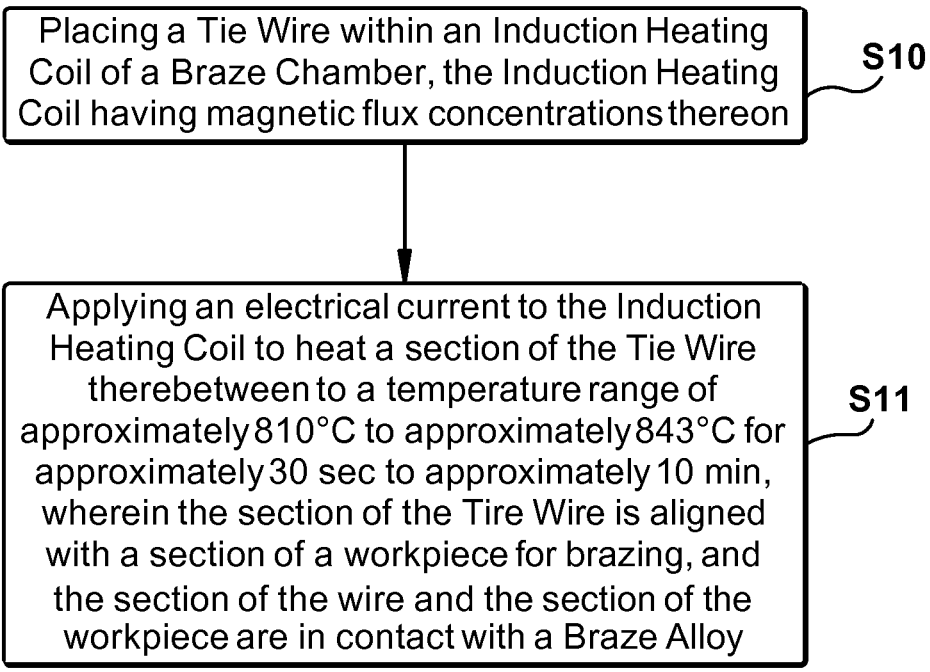
FIG. 4 shows a flow diagram of another embodiment of a method of forming a brazed joint between a tie wire and a workpiece, in accordance with the present invention.

Alternatively, braze chamber 20 may comprise two induction heating coils, first induction heating coil 15 and second induction heating coil 16, see FIG. 2. First and second induction heating coils 15 and 16 may also have magnetic flux concentrators 41 thereon which direct most of the magnetic flux from each induction heating coil 15 and 16 toward the other induction heating coil along a section of a workpiece therebetween. One having ordinary skill in the art will recognize from hereonin, that any description regarding induction heating coil 11 and particularly induction heating coil ends 12 and 14, is equally applicable to the embodiment where braze chamber 20 comprises first and second induction heating coils 15 and 16.

Magnetic flux concentrators 41 (also known as flux intensifiers, diverters, or controllers) may be laminations made from high-permeability, low-power loss materials. Magnetic flux concentrators 41 may perform functions in induction hardening such as: providing a selective heating of certain areas of a workpiece; improving electrical efficiency of an induction coil; and acting as an electromagnetic shield to prevent undesirable heating of adjacent regions. In an embodiment, magnetic flux concentrators 41 may include laminations of electrolytic iron-based materials, carbonyl iron-based materials, pure ferrite materials, ferrite-based materials, soft formable materials, and the like. Examples of laminations include but are not limited too nickel-iron alloys, cold-rolled iron-silicon alloys, and hot-rolled iron-silicon alloys. Examples of pure ferrite materials include but are not limited to structures made by mixing iron oxide (FeO) with oxides of one or more metals such as nickel, zinc, and magnesium.

Examples of ferrite materials include but are not limited to structures made by mixing FeO with carbonates of one or more metals such as nickel, zinc, and magnesium. Other magnetic flux concentrators not described herein but known in the art are considered within the scope of the present invention.

In an embodiment, induction heating coil 11 and particularly, induction heating coil ends 12 and 14 may heat the workpiece therebetween to a temperature in a range from approximately 705° C. to approximately 810° C. In another embodiment, induction heating coil ends 12 and 14 may heat the workpiece to a temperature in a range from approximately 725° C. to approximately 750° C.

Controller 40 may comprise temperature sensors 42 and 44, and may receive temperature feedback signals from temperature sensors 42 and 44 which relay the temperature of the workpieces at any particular time. For example, temperature sensors 42 and 44 may be on workpiece 60 and a tie wire 50 respectively to monitor the temperature of each piece as heat is applied to the tie wire via induction heating coil ends 12 and 14. In an embodiment, temperature sensors 42 and 44 may be a pyrometer and the like. Controller 40 may also apply an electrical current to induction heating coil ends 12 and 14 to heat a section of tie wire 50 therebetween, and vary the heat applied by induction heating coil ends 12 and 14 based on the temperature feedback signals from temperature sensors 42 and 44.

Referring to FIGS. 1-4, an embodiment of a method of forming a brazed joint between a tie wire 50 and a workpiece 60 is presented. In step S1 (step S10 of FIG. 4), tie wire 50 may be placed within an induction heating coil 11 and particularly, induction heating coil ends 12 and 14 of braze chamber 20. Tie wire 50 may be placed in induction heating coil ends 12 and 14 by inserting tie wire 50 within induction heating coil ends 12 and 14 while they are in a closed position. Alternatively, tie wire 50 may be placed within induction heating coil ends 12 and 14 while open, and then induction heating coil ends 12 and 14 may be closed such that they surround a section of tie wire 50. Induction heating coil ends 12 and 14 may have magnetic flux concentrators 41 thereon which direct the magnetic flux of each induction heating coil end toward the other induction heating coil end along section 55 of tire wire 50 therebetween. Induction heating coils and their operation are known in the art.

In step S2, a section of workpiece 60 for brazing may be aligned with section 55 of tie wire 50. Workpiece 60 is aligned with tie wire 50 such that tie wire 50 goes through the thickness of workpiece 60 perpendicular to its air foil surface. The physical relationship of tie wire 50 with workpiece 60 is known in the art. The width of the space (not shown) between the section of workpiece 60 aligned with section 55 of tie wire 50 for brazing may be the eventual width/thickness of the brazed joint. In an embodiment, the width of the space, i.e., the thickness of the joint, between the section of workpiece 60 aligned with section 55 may be in a range from approximately 0.5 cm to approximately 5 cm. In another embodiment, the width of the space may be approximately 4 cm. In another embodiment, the width of the space may be 3.18 cm.

Tie wire 50 may be coupled to workpiece 60 as well as multiple workpieces (not shown). Tie wire 50 may comprise ferritic stainless steel, for example, 405 type stainless steel. In an embodiment, tie wire 50 may be non-hardenable ferritic steel. Tie wire 50 may also have a diameter in a range from approximately 0.5 cm to approximately 2.5 cm. Workpiece 60 may be a stainless steel turbine bucket and may comprise martensitic stainless steel. Workpiece 60 also may be an element of a steam turbine, a gas turbine, and the like. Tie wire 50 and turbine buckets are known in the art.

In step S3, braze alloy 30 may be applied to the section of workpiece 60 and section 55 of tie wire 50 aligned with each other such that braze alloy 30 may be in contact with both of the aforementioned pieces. Braze alloy 30 may be applied after tie wire 50 and workpiece 60 have been aligned. Alternatively, braze alloy 30 may be applied to tie wire 50 prior to alignment with workpiece 60. In another embodiment, braze alloy 30 may be applied to workpiece 60 prior to alignment with tie wire 50. In an embodiment, braze alloy 30 may be pre-applied as a ring or sheet form so as to allow braze alloy 30 flow via capillary action to move into the brazed joint. Braze alloy 30 may be an alloy from the BAg (braze silver) family and particularly, BAg-24 alloy. The BAg family of braze alloys is known in the art.

Braze alloy 30 is an alloy that may be any material capable of being heated to a temperature above approximately 450° C. and melted at a temperature above approximately 650° C., and distributed between two or more close-fitting parts by capillary action. Braze alloy 30 may be brought slightly above its melting (liquidus) temperature while protected by a suitable atmosphere or a braze flux. Braze alloy 30 may then interact with a thin layer at the surface of the two parts and may then be cooled rapidly to form a sealed joint. In an embodiment, the parts may be tie wire 50 and workpiece 60.

Braze alloy 30, for example, may be an aluminum-silicon alloy, a gold-silver alloy, a nickel alloy, a silver alloy, and the like. Braze alloy 30 may be available as a rod, a ribbon, a paste, a powder, a paste, a cream, a wire, and a preform such as a stamped washer.

Braze chamber 20 may then be closed and may be purged to an essentially oxygen free atmosphere having less than 400 parts per million (ppm) of oxygen. The purge gas may be a mixture of hydrogen and nitrogen and may also serve as a reducing atmosphere. In an embodiment, braze chamber 20 may be a portable chamber.

In an embodiment, brazing of tie wire 50 and workpiece 60 may be performed in an atmosphere having greater than 400 ppm oxygen with the use of brazing flux. Brazing flux and methods of its use are known in the art. In another embodiment, aligning the section of workpiece 60 with section 55 of tie wire 50 may be performed while braze chamber 20 is closed. Subsequently, braze alloy 30 may be applied to the section of workpiece 60 and section 55 of tie wire 50 for brazing via braze alloy feed holes 65 as indicated by directional arrows 67.

In step S4 (step S11 of FIG. 4), section 55 of tie wire 50 between induction heating coil ends 12 and 14 may be heated by applying an electrical current to induction heating coil ends 12 and 14. Magnetic flux concentrators 41 thereon may direct most of the magnetic flux into the section of tie wire 50 between induction heating coil ends 12 and 14. The heat generated may be transferred to the joint by conduction processes and the section of workpiece 60 aligned with tie wire 50 for brazing may be heated by radiation processes via contact with tie wire 50. The use of magnetic flux concentrators 41 may also direct a limited amount of the magnetic flux to directly heat workpiece 60.

The use of various combinations of applied current and the duration of the applied current to tie wire 50 via induction heating coil ends 12 and 14 may provide for a method that is repeatable in forming a brazed joint therebetween consistently having proper strength, and without hard spots and eventual stress corrosion cracks in the brazed joint as well as workpiece 60. Preselected combinations of applied current and duration may be repeatedly used to produce a brazed joint having corresponding preselected positive attributes.

In an embodiment, current may be applied to induction heating coil ends 12 and 14, via controller 40, for approximately 30 sec to approximately 10 min to heat section 55 of tie wire 50 to a temperature range of approximately 705° C. to approximately 810° C. resulting in the transfer of heat to tie wire 50, braze alloy 30, and workpiece 60. Tie wire 50 may then be cooled having been brazed with workpiece 60.

The aforementioned examples are not meant to be limiting, and may be applied to any tie wire and workpiece of any geometry to form a brazed joint therebetween. One having ordinary skill in the art may be able to determine without undue experimentation different combinations of applied current, duration, and temperature to heat tie wire 50 to ensure heat transfer between tie wire 50, braze alloy 30 and workpiece 60.

The repeatability of the method of the present invention may also reduce if not eliminate operator variability. The operator will not have to subjectively determine (or guess) if enough heat has been applied to form a quality braze joint as is typically done by operators performing typical torch brazing methods. Also, the quality of the brazed joint may not be affected by the skill level of the operator. The repeatability of the method may also reduce extensive and destructive, post-process quality testing for workpiece 60 hardness.

As a result of the method of the present invention being consistently repeatable and reducing operator variability the method may be transferred to any work site and performed on any tie wire and workpiece of varying sizes and geometries with minimal operator training.

It has been discovered that an advantage that may be realized in the practice of some embodiments of a method of forming a brazed joint between tie wire 50 and workpiece 60 is that having a section tie wire 50 between induction heating coil ends 12 and 14, or a first and second induction heating coil 15 and 16 with magnetic flux concentrators 41 thereon allows control of most of the amount of heat transferred to tie wire 50, workpiece 60, and braze alloy 30 ensuring complete brazing throughout the thickness of the joint, thus eliminating hard spots. It has also been discovered that an advantage that may be realized in the practice of some embodiments of a method of forming a brazed joint of the present invention is that the method provides a repeatable process resulting in removal of operator variability.

It has also been discovered that an advantage that may be realized in the practice of some embodiments of a method of forming a brazed joint of the present invention is that the process can be transferred from one worksite to another with minimal operator training. It has also been discovered that an advantage that may be realized in the practice of some embodiments of a method of forming a brazed joint of the present invention is that the process may lead to reduced stress corrosion cracking of buckets. It has also been discovered that an advantage that may be realized in the practice of some embodiments of a method of forming a brazed joint of the present invention is that the method provides better braze joint quality resulting in reduced potential of cracked braze joints.

The terms "first", "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for forming a brazed joint between a tie wire and a bucket of a steam turbine, the system comprising:
   a braze chamber including an induction heating coil, the induction heating coil having magnetic flux concentrators thereon; and
   a controller receiving a temperature feedback signal from a temperature sensor on the tie wire and controlling a temperature of a section of the tie wire to be brazed by controlling an electrical current applied to the induction heating coil,
   wherein the induction heating coil is positioned at a section of the tie wire distinct from the section of the tie wire to be brazed, and the controller regulates a temperature of a location of the brazed joint by controlling the electrical current applied to the induction heating coil.

2. A system for forming a brazed joint according to claim 1, wherein the magnetic flux concentrators direct a magnetic flux from the induction heating coil toward a section of the tie wire therebetween, the induction heating coil indirectly heating the section of the tie wire to be brazed.

3. A system for forming a brazed joint according to claim 1, further comprising a braze alloy in contact with a section of the bucket and the section of the tie wire to be brazed,
   wherein the tie wire transfers heat to the section of the bucket and the braze alloy.

4. A system for forming a brazed joint according to claim 1, further comprising a braze alloy in contact with the bucket and the section of the tie wire to be brazed, the induction heating coil heating the bucket via the tie wire.

5. A system for forming a brazed joint according to claim 1, further comprising a second induction heating coil, the second induction heating coil having magnetic flux concentrators thereon.

6. A system for forming a brazed joint according to claim 1, wherein the induction heating coil heats a section of the tie wire therebetween to a temperature range from approximately 705° C. to approximately 810° C.

7. A system for forming a brazed joint according to claim 6, wherein the temperature range is maintained for approximately 30 sec to approximately 10 min, and
wherein the tie wire includes non-hardenable ferritic steel.

8. A method of forming a brazed joint, the method comprising:
placing a tie wire within a section of an induction heating coil of a braze chamber, the induction heating coil having magnetic flux concentrators thereon;
aligning a section of a steam turbine bucket for brazing with a section of the tie wire for brazing, wherein the section of the tie wire for brazing is distinct from the section of the induction heating coil within the induction heating coil;
applying a braze alloy in contact with the section of the steam turbine bucket and the section of the tie wire to be brazed;
applying an electrical current to the induction heating coil to heat the section of the tie wire for brazing to form the brazed joint;
receiving a temperature feedback signal from a temperature sensor on the tie wire; and
regulating a temperature of the tie wire and the steam turbine bucket by controlling the electrical current applied to the induction heating coil.

9. A method of forming a brazed joint according to claim 8, wherein the tie wire comprises ferritic steel.

10. A method of forming a brazed joint according to claim 8, further comprising using the magnetic flux concentrators to direct a magnetic flux from the induction heating coil along the section of the tie wire therebetween, the induction heating coil heating the section of the tie wire.

11. A method of forming a brazed joint according to claim 8, wherein the induction heating coil heats the section of the tie wire therebetween to a temperature range from approximately 705° C. to approximately 810° C. for approximately 30 sec to approximately 10 min.

12. A method of forming a brazed joint according to claim 8, wherein the brazed joint has a thickness in the range from approximately 0.5 cm to approximately 5 cm.

13. A method of forming a brazed joint according to claim 8, further comprising using a second induction heating coil to heat the tie wire, the second induction heating coil having magnetic flux concentrators thereon.

14. A method of forming a brazed joint according to claim 8, wherein the section of the tie wire to be brazed is indirectly heated with the induction heating coil.

15. A method of forming a brazed joint according to claim 14, wherein the bucket comprises martensitic steel and the tie wire includes non-hardenable ferritic steel.

16. A method of forming a brazed joint, the method comprising:
placing a tie wire within an induction heating coil of a braze chamber, the induction heating coil having magnetic flux concentrators thereon;
applying an electrical current to the induction heating coil to heat a section of the tie wire therebetween to a temperature range of approximately 705° C. to approximately 810° C. for approximately 30 sec to approximately 10 min,
wherein the section of the tie wire is aligned with a section of a workpiece for brazing, and the section of the tie wire and the section of the workpiece are in contact with a braze alloy;
receiving a temperature feedback signal from a temperature sensor on the tie wire; and
regulating the temperature range of the tie wire and the workpiece by controlling the electrical current applied to the induction heating coil.

17. A method of forming a brazed joint according to claim 16, wherein the workpiece includes a bucket in contact with the braze alloy and the tie wire.

18. A method of forming a brazed joint according to claim 16, further comprising indirectly heating the section of the tie wire aligned with the section of the workpiece for brazing with the induction heating coil, the induction heating coil being positioned at a section of the tie wire distinct from the section of the tie wire aligned with the section of the workpiece for brazing.

19. A method of forming a brazed joint according to claim 16, wherein a brazed joint formed has a thickness in a range from approximately 0.5 cm to approximately 5 cm.

20. A method of forming a brazed joint according to claim 16, further comprising using a second induction heating coil to heat the tie wire, the second induction heating coil having magnetic flux concentrators thereon.

* * * * *

UNITED STATES PATENT AND TRADEMARK OFFICE
CERTIFICATE OF CORRECTION

Page 1 of 1

| | |
|---|---|
| PATENT NO. | : 8,735,782 B2 |
| APPLICATION NO. | : 12/765172 |
| DATED | : May 27, 2014 |
| INVENTOR(S) | : Jeffrey Michael Breznak |

It is certified that error appears in the above-identified patent and that said Letters Patent is hereby corrected as shown below:

On the Title Page, Item (74) Attorney, Agent, or Firm:

Delete:
"Ernst"

Insert:
-- Ernest --

Signed and Sealed this
Second Day of September, 2014

Michelle K. Lee
*Deputy Director of the United States Patent and Trademark Office*